United States Patent
Piggott

(10) Patent No.: US 7,520,537 B2
(45) Date of Patent: Apr. 21, 2009

(54) ATTACHMENT NUT FOR OIL COOLER LINE

(75) Inventor: Alfred Piggott, Redford, MI (US)

(73) Assignee: DENSO International America, Inc., Southfield, MI (US)

( * ) Notice: Subject to any disclaimer, the term of this patent is extended or adjusted under 35 U.S.C. 154(b) by 779 days.

(21) Appl. No.: 11/068,280

(22) Filed: Feb. 28, 2005

(65) Prior Publication Data

US 2006/0192379 A1 Aug. 31, 2006

(51) Int. Cl.
*F16L 27/00* (2006.01)

(52) U.S. Cl. ............... 285/189; 285/201; 81/176.2; 81/176.15

(58) Field of Classification Search ............ 285/143.1, 285/201, 189; 184/104.1; 165/140, 916; 411/910; 81/124.2, 176.1, 176.15, 176.2, 81/121.1

See application file for complete search history.

(56) References Cited

U.S. PATENT DOCUMENTS

| | | | | | |
|---|---|---|---|---|---|
| 5,555,929 | A | * | 9/1996 | Ishikawa | 285/189 |
| 6,871,401 | B1 | * | 3/2005 | Blankenship | 81/124.2 |
| 2002/0194966 | A1 | * | 12/2002 | Elmore | 81/124.2 |
| 2004/0250660 | A1 | * | 12/2004 | Rogers | 81/124.2 |

* cited by examiner

*Primary Examiner*—Aaron M Dunwoody
(74) *Attorney, Agent, or Firm*—Harness, Dickey & Pierce, PLC

(57) ABSTRACT

A mounting arrangement for coupling an oil line to an oil cooler includes an oil cooler defining a first fluid passage. A fluid line defines a second fluid passage. A nut having a central passage is adapted to threadably engage the oil cooler and provide a fluid-tight seal between the first fluid passage and the second fluid passage. The nut includes a perimeter defining at least two engagement surfaces. The engagement surfaces are adapted to be engaged only in a first direction.

19 Claims, 3 Drawing Sheets

ATTACHMENT NUT FOR OIL COOLER LINE

FIELD OF THE INVENTION

The present invention relates to powertrain cooling systems in vehicles and more particularly to a one-way nut and attachment tool for attaching oil cooler lines to a radiator.

BACKGROUND OF THE INVENTION

In automotive vehicles incorporating automatic transmissions, it is common to provide a separate cooling circuit for the transmission fluid. Typically, the transmission fluid (oil) is pumped by the transmission into a heat exchanger provided in the radiator. In one example, the oil lines are coupled to the radiator by way of a quick connect coupling provided on an inlet pipe extending from the radiator. In such an example the inlet pipe is fixed to the radiator using a permanent coupling such as a hex nut. Once installed, the hex nut is intended to be undisturbed through the life of the vehicle. If access to the radiator and oil line interface is desired, the quick connect is to be utilized.

In one advantage, quick connects provide a technician a fast method of attaching and detaching the oil lines to the radiator. In another advantage, quick connects may be incorporated such that a technician may detach/attach the oil lines without disturbing the permanent coupling on the radiator housing. Sometimes, a technician will be unaware of the quick connect feature and remove the oil lines by turning the hex nut rather than utilizing the quick connect feature. In some instances, manipulating the hex nut may damage the radiator.

SUMMARY OF THE INVENTION

A mounting arrangement for coupling an oil line to an oil cooler includes an oil cooler defining a first fluid passage. A fluid line defines a second fluid passage. A nut having a central passage is adapted to threadably engage the oil cooler and provide a fluid-tight seal between the first fluid passage and the second fluid passage. The nut includes a perimeter defining at least two engagement surfaces. The engagement surfaces are adapted to be engaged only in a first direction.

According to other features the perimeter defines arcuate surfaces interposed between the engagement surfaces. The arcuate surfaces extend between an inboard side of the engagement surfaces and an outboard side of an adjacent engagement surface. The nut defines a flange on a distal surface.

A tool includes a cylindrical body portion and defines an inboard surface. The inboard surface includes at least one engagement surface. The tool is operable to accept the nut within the cylindrical body portion and apply force onto the engagement surfaces of the nut upon rotation of the tool in the first direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
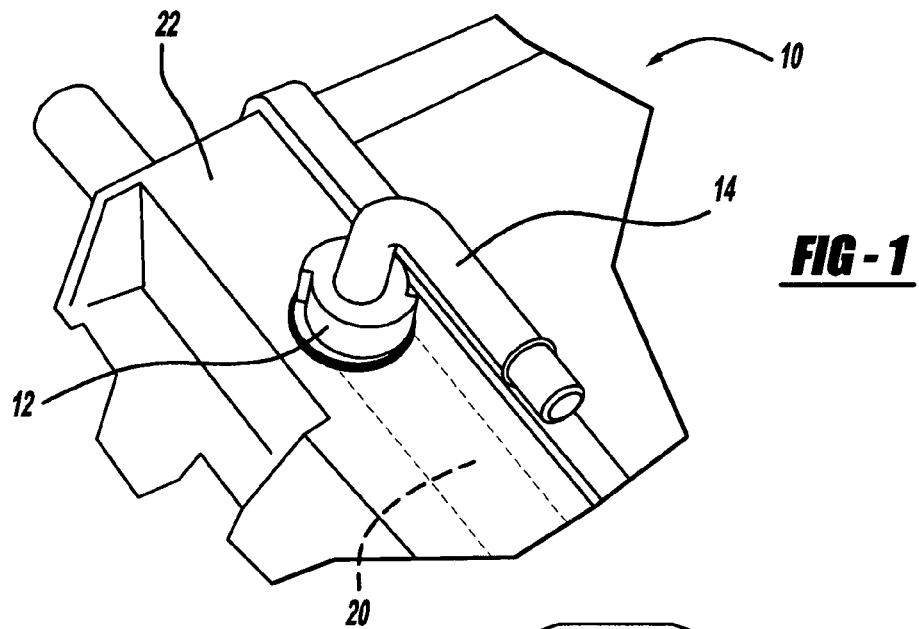
FIG. 1 is a perspective view of a mounting arrangement including a one-way nut for coupling an oil line to a radiator according to the present teachings.

With initial reference to FIG. 1, a mounting arrangement for coupling an oil line to an oil cooler configured in a radiator according to the present teachings is shown and generally identified at reference 10. The mounting arrangement 10 generally includes a one-way nut 12 operable to threadaby secure an oil line 14 to an oil cooler 20 provided in a radiator 22. As will be described in greater detail, the nut 12 may be engaged with a tool 26 for rotating the nut 12 in a tightening direction only (clockwise as viewed from FIG. 1). The nut 12 does not present a suitable gripping surface for rotating the nut 12 in a loosening direction (counterclockwise). The oil cooler 20 generally defines a fluid passage or inlet 28 (FIG. 2) for aligning with a second fluid passage or outlet 30 defined on the fluid line 14. In an installed position (FIG. 1), the nut 12 maintains a fluid-tight seal between the inlet 28 of the oil cooler 20 and the outlet 30 of the fluid line 14. It is appreciated that while the mounting arrangement discussed herein is specifically directed to an inlet for accepting oil into an oil cooler, the mounting arrangement is similarly applicable to other ports provided on an oil cooler or radiator such as, but not limited to, an outlet for delivering cooled oil away from an oil cooler.

Figure 2:
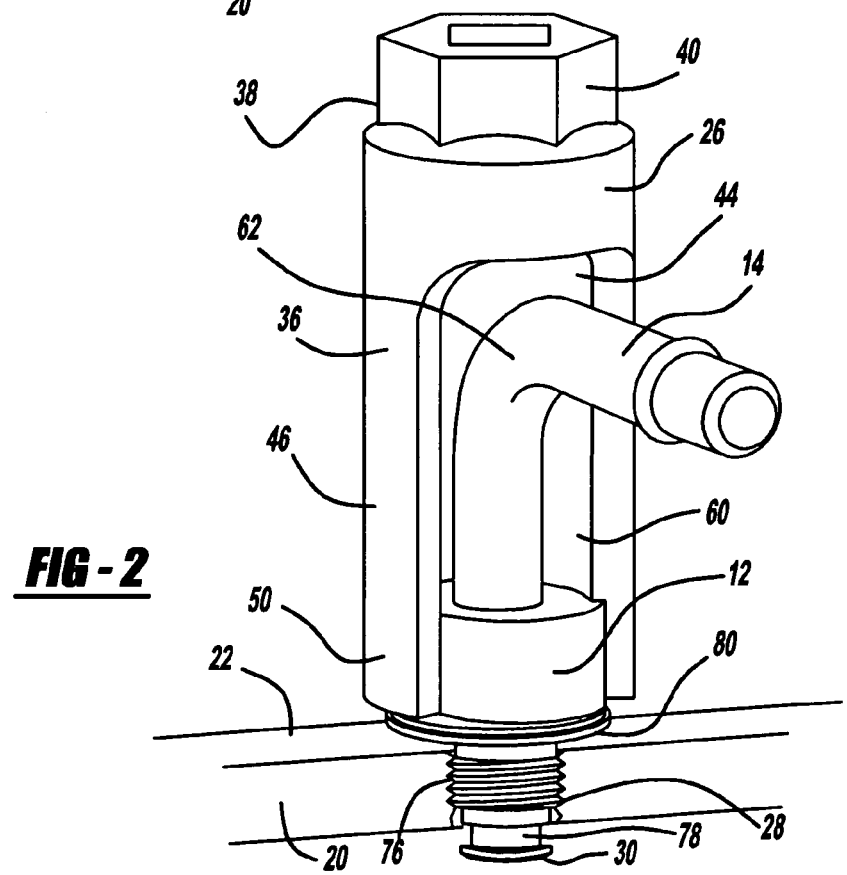
FIG. 2 is a perspective view of the one-way nut of FIG. 1 shown with a tool for imparting rotational motion onto the nut.
Figure 5:
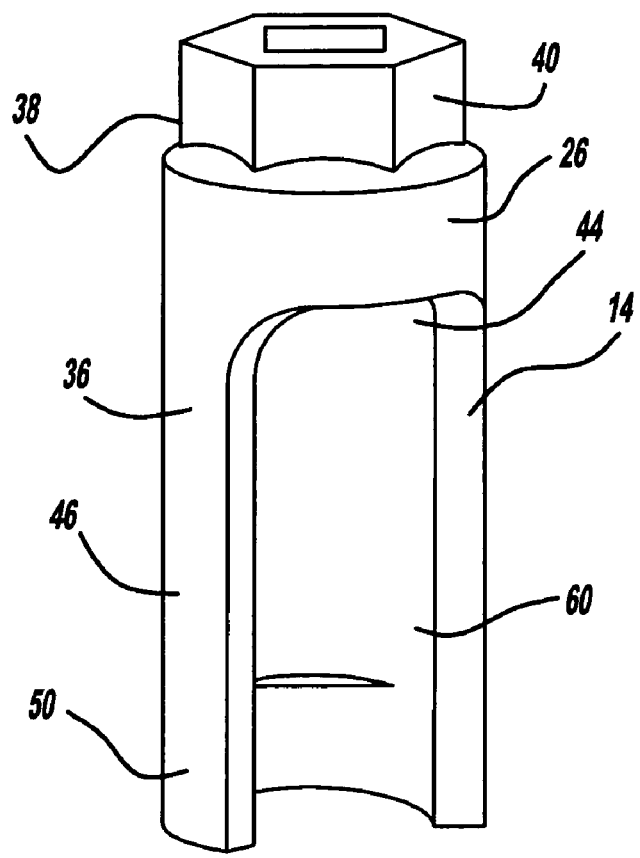
FIG. 5 is a perspective view of the tool of FIG. 2.
Figure 6:
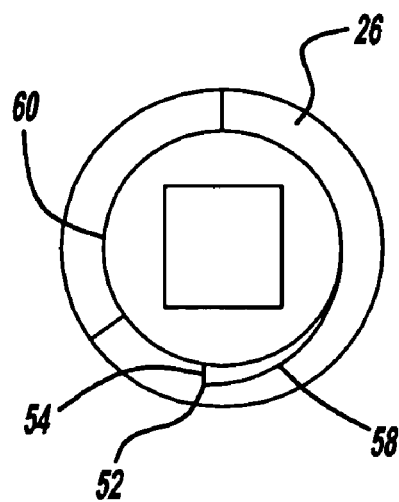
FIG. 6 is a bottom view of the tool of FIG. 5.

Turning now to FIGS. 2, 5 and 6, the tool 26 for cooperating with the nut 12 is illustrated. The tool 26 defines a cylindrical body 36 and includes a proximal end 38 having a mating surface 40. The cylindrical body 36 of the tool 26 defines an inboard surface 44 and an outboard surface 46.

The mating surface 40 is illustrated as a hexagonal head for mating with a conventional wrench or socket. It is appreciated that the mating surface 40 may comprise other configurations such as those adapted to cooperate with conventional screwdrivers or other hand tools. The tool 26 includes a distal end 50 having a complementary engagement surface 52 (FIG. 6) for engaging the nut 12 as will be described in further detail herein. The complementary engagement surface 52 is defined on the inboard surface 44 of the nut 12. The complementary engagement surface 52 is generally a planar surface 54 arranged at a terminal end of a ramped groove 58 suitable to cooperate with the nut 12.

The cylindrical body 36 defines an opening 60 for accepting the fluid line 14. As shown in FIG. 2, the fluid line 14 presents an elbow 62. The opening 60 of the cylindrical body 36 accommodates the elbow 62 such that appropriate access can be made to the nut 12 during a tightening event.

Figure 3:
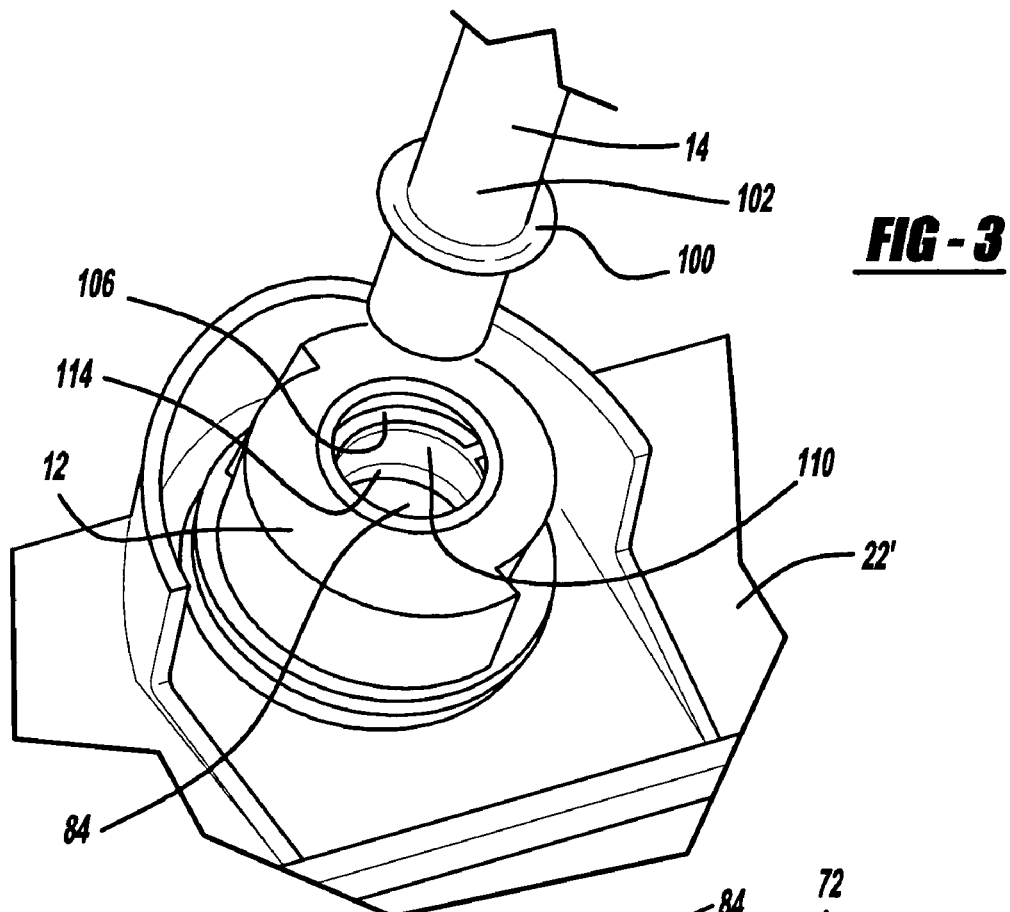
FIG. 3 is a detailed perspective view of the mounting arrangement of FIG. 1.
Figure 4:
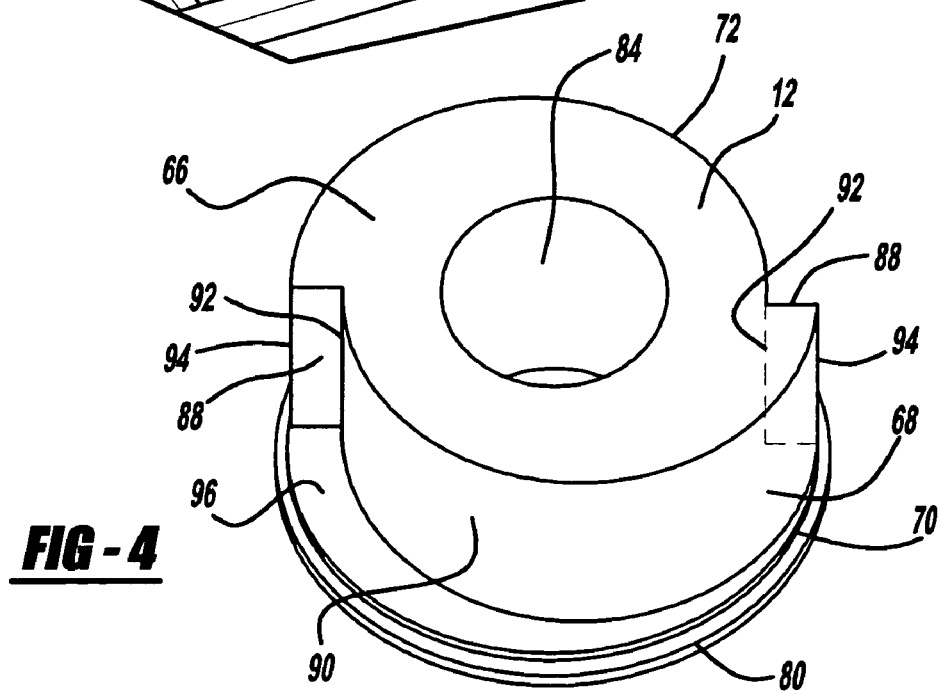
FIG. 4 is a perspective view of the one-way nut.

With reference now to FIGS. 2-4, the nut 12 will be described in greater detail. The nut 12 generally defines a body portion 66 having a perimeter surface 68 extending between a distal end 70 and a proximal end 72. The distal end 70 defines a threaded extension 76 (FIG. 2) for locating into the radiator and threading into the inlet 28 of the oil cooler 20. In one implementation, a sealing compound may be disposed around the threaded extension 76 to encourage a seal thereat. A distal neck 78 is arranged to accept an o-ring (not shown) to sealably engage an interface of the oil cooler 20.

A washer 80 is journalled around the threaded extension 76 and operable to be sandwiched between the nut 12 and the radiator 22. The nut 12 defines a central passage 84 through the body portion 66. The central passage 84 is adapted to receive the fluid line 14. The perimeter surface 68 includes planar engagement surfaces 88 arranged thereon. The planar engagement surfaces 88 are configured to cooperate with the tool 26 such that the force may be applied onto at least one of the engagement surfaces 88 to impart rotational motion in a clockwise (tightening) direction. While the nut 12 is shown having a pair of engagement surfaces, a single engagement surface or more than a pair of engagement surfaces may be incorporated.

The planar engagement surfaces 88 each occupy a plane that intersects the central passage 84. While the planar engagement surfaces 88 are illustrated as coplanar, they may be arranged on distinct planes, each intersecting the central passage 84. Arcuate surfaces 90 are interposed between the planar engagement surfaces 88. The arcuate surfaces 90 extend between an inboard side 92 of a first planar engagement surface 88 and an outboard side 94 of an adjacent planar engagement surface 88. As a result, the arcuate surfaces 90 each define a ramp progressing radially outwardly in a counterclockwise direction around the nut 12. The distal end 70 of the nut 12 defines a flange 96.

With specific reference now to FIG. 3, a mounting interface between the nut 12 and the fluid line 14 will be described in greater detail. The nut 12 and the fluid line 14 are shown cooperating with an exemplary radiator 22' having an alternate configuration from the radiator 22 of FIG. 1. The fluid line 14 includes an annular bead 100 arranged on a distal end 102. A snap ring 106 disposed around an inner diameter of the nut 12 is adapted to expand and accept the annular bead 100 as the fluid line 14 is inserted into the central passage 84 of the nut 12. Once the annular bead 100 passes the snap ring 106, the snap ring 106 retracts to capture the annular bead 100 and therefore the fluid line 14. A guide 110 is disposed within the nut 12 for guiding the fluid line 14 into a locked position. An o-ring 114 is disposed inboard of the guide to provide a seal at an outer diameter of the fluid line 14.

With reference now to all the drawings, operation of the nut 12 and the tool 26 will be described in greater detail. At the outset the tool 26 is located into engagement with the nut 12 by locating the elbow portion 62 of the fluid line 14 into the opening 60 provided on the tool 26. Next, rotatable motion in a tightening direction is imparted onto the tool 26 (such as by way of a conventional wrench or socket or other supplemental device coupled to the proximal end 38 of the tool 26). Again, the tightening direction is defined herein as the clockwise direction. The complementary engagement surface 52 of the tool 26, impart's rotational motion onto at least one of the planar engagement surfaces 88 of the nut 12 causing the nut 12 to tighten. Rotation of the tool 26 in a loosening or counter-clockwise direction will result in the tool 26 ramping around the arcuate surfaces 90 without any rotational force transferred onto the nut 12. Once a desired torque is achieved, the tool 26 may be removed from engagement with the nut 12.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A mounting arrangement for coupling an oil line to an oil cooler comprising:
    an oil cooler defining a first fluid passage;
    a fluid line defining a second fluid passage;
    a nut having a central passage, said nut adapted to threadably engage said oil cooler and provide a fluid-tight seal between said first fluid passage and said second fluid passage, said nut having a perimeter defining at least two engagement surfaces, whereby said at least two engagement surfaces are adapted to be engaged only in a first direction.

2. The mounting arrangement of claim 1 wherein said perimeter defines arcuate surfaces interposed between said at least two engagement surfaces.

3. The mounting arrangement of claim 2 wherein said arcuate surfaces extend between an inboard side of said at least two engagement surfaces and an outboard side of an adjacent engagement surface of said at least two engagement surfaces.

4. The mounting arrangement of claim 3 wherein said nut defines a flange on a distal surface.

5. The mounting arrangement of claim 4 wherein said first direction is clockwise around an axis defined by said central passage.

6. A mounting arrangement for coupling an oil line to an oil cooler comprising:
    an oil cooler defining a first fluid passage;
    a fluid line defining a second fluid passage;
    a nut having a central passage, said nut adapted to threadably engage said oil cooler and provide a fluid-tight seal between said first fluid passage and said second fluid passage, said nut defining at least two planar surfaces arranged on a perimeter of said nut, wherein said at least two planar surfaces occupy a plane that intersects said central passage and wherein application of force onto said at least two planar surfaces causes said nut to rotate in a first direction, and wherein said perimeter defines arcuate surfaces interposed between said at least two engagement surfaces, said arcuate surfaces having a radius of curvature that continuously changes with respect to a centerline of said central passage.

7. The mounting arrangement of claim 6 wherein said accurate surfaces initiate from an inboard side of said at least two engagement surfaces and terminate at an outboard side of an adjacent engagement surface of said at least two engagement surfaces.

8. The mounting arrangement of claim 7 wherein said nut defines a flange on a distal surface.

9. The mounting arrangement of claim 8 wherein said first direction is clockwise around an axis defined by said central passage.

10. A system for coupling an oil line to an oil cooler comprising:
    an oil cooler defining a first fluid passage;
    a fluid line defining a second fluid passage;
    a nut having a central passage, said nut adapted to threadably engage said oil cooler and provide a fluid-tight seal between said first fluid passage and said second fluid passage, said nut defining at least two planar surfaces arranged on a perimeter of said nut, wherein said at least two planar surfaces occupy a plane that intersects said central passage; and a tool having a cylindrical body portion and defining an inboard surface, said inboard surface having at least one engagement surface wherein said tool is operable to accept said nut within said cylindrical body portion and apply force onto said at least two planar surfaces with said at least one engagement surface upon rotation of said tool in a first direction.

11. The system of claim 10 wherein said tool defines a proximal end and a distal end, said proximal end defining a mating surface for accepting a secondary tool thereat.

12. The system of claim 11 wherein said mating surface defines a hexagonal head operable to accept a socket thereat.

13. The system of claim 11 wherein said distal end defines an opening formed through said cylindrical body portion.

14. The system of claim 13 wherein said fluid line defines an elbow portion extending away from said second fluid passage, wherein said elbow portion is adapted to nest through said opening in said cylindrical body portion during operation of said tool.

15. The system of claim 10 wherein said perimeter defines arcuate surfaces interposed between said at least two engagement surfaces.

16. The system of claim 15 wherein said arcuate surfaces initiate from an inboard side of said at least two engagement surfaces and terminate at an outboard side of an adjacent engagement surface of said at least two engagement surfaces.

17. The system of claim 16 wherein said nut defines a flange on a distal end.

18. The system of claim 17 wherein said first direction is clockwise around an axis defined by said central passage.

19. The system of claim 11 wherein at least one engagement surface of said tool defines a complementary planar surface adapted to engage one of said at least two planar surfaces in said first direction only.

* * * * *